United States Patent Office 2,971,145
Patented Feb. 7, 1961

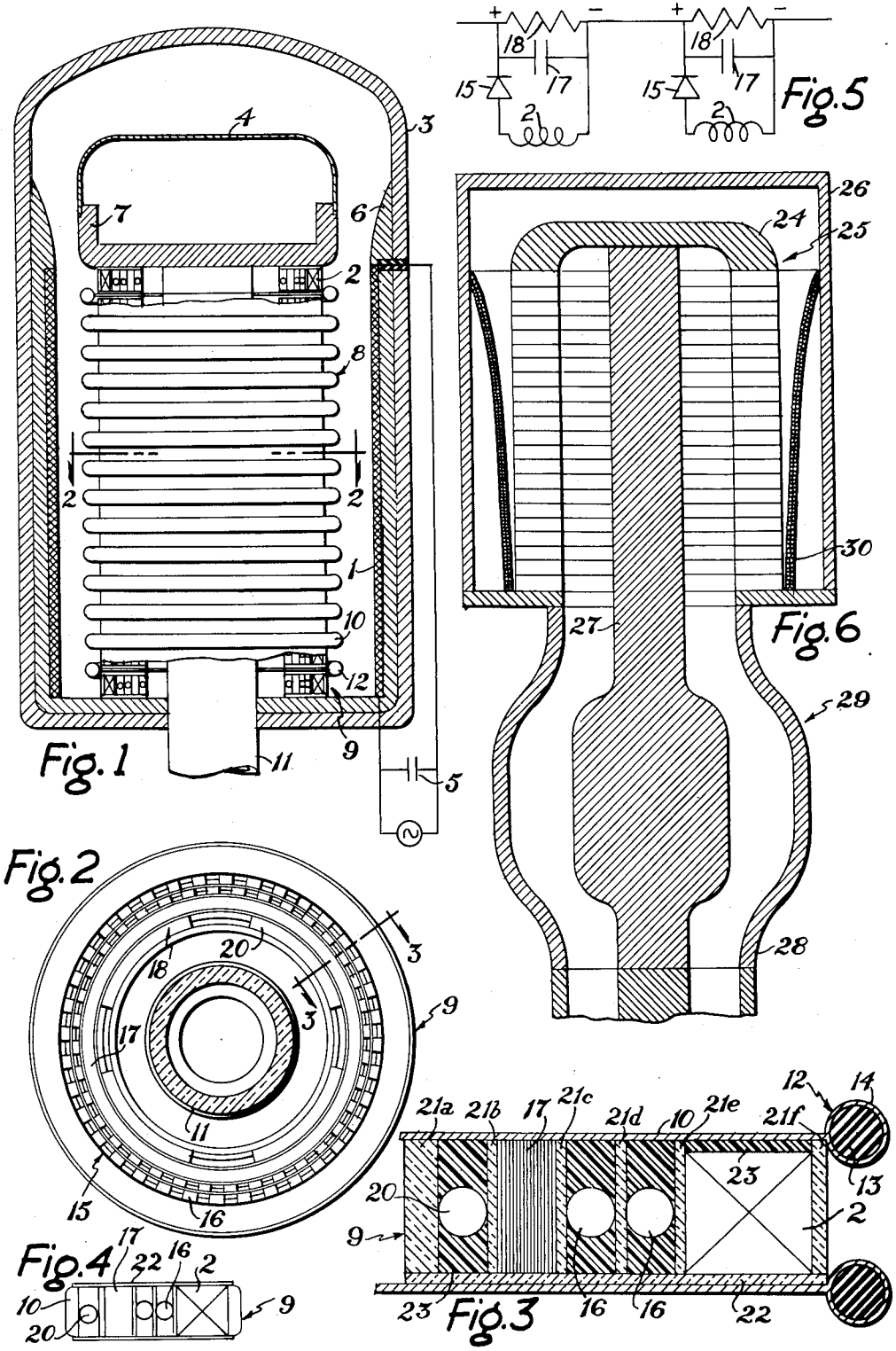

2,971,145

UNI-DIRECTIONAL HIGH VOLTAGE GENERATOR

Harald A. Enge, Winchester, Mass., assignor to High Voltage Engineering Corporation, Burlington, Mass., a corporation of Massachusetts Filed July 24, 1958, Ser. No. 750,794

8 Claims. (Cl. 321—8)

This invention relates to the generation of uni-directional high voltages, and in particular to a transformer whose output is rectified and filtered in small increments by means of a novel arrangement. The invention includes both air core and solid core embodiments. The air core embodiment of the invention has definite advantages especially for the generation of high voltages at intermediate and low power such as is required in nuclear research. The particular solid core embodiment of the invention is particularly adapted to the generation of high power by a central generator and the delivery thereof to a plurality of remote accelerators; such an arrangement would be particularly useful for providing a plurality of radiation sources in installations such as chemical plants.

The invention may best be understood from the following detailed description thereof having reference to the accompanying drawing in which:

Fig. 1 is a side elevation partly in vertical central section of an air core transformer constructed in accordance with the invention;

Fig. 2 is an enlarged view of a section taken along the line 2—2 of Fig. 1;

Fig. 3 is an enlarged view of a section taken along the line 3—3 of Fig. 2;

Fig. 4 is a reduced view of a modified form of the section shown in Fig. 3;

Fig. 5 is a circuit diagram illustrating the operation of two stages of the apparatus of Figs. 1–4; and Fig. 6 is a view in longitudinal central section of a solid core transformer constructed in accordance with the invention.

Referring to the drawing and first to Figs. 1–4 thereof, the air core transformer therein shown includes a primary coil 1 which encircles a secondary coil comprising a multiplicity of coil elements 2 which are connected in series between a grounded tank 3 and a high voltage terminal 4. Because there is no magnetic core, it is necessary that a relatively high current be delivered to the primary coil 1 in order to link the secondary coils 2 with a sufficiently high magnetic flux density. In order to achieve this high current, a condenser 5 is added to the primary circuit and the primary circuit, which now includes the primary coil 1 and the condenser 5, is operated at resonance. In a representative operation of the transformer the current in the primay circuit is 15 times the equivalent load current drawn from the secondary. By operating at high frequencies the achievement of such a high current is easy to accomplish since the high frequencies reduce the size of the condenser 5. In fact, in a representative example operating at 5 million volts and 5 kilowatts output, a condenser 5 can be used which is small enough to fit in the hand and which costs less than $100.

The excess current in the primary circuit over that required to deliver the load is used to maintain the magnetic field linking the secondary coil. However, there are no large charging currents in the secondary coil because of the fact that each coil element 2 is rectified and filtered separately from the other coil elements 2. If there were no rectifiers, the charging current in the secondary resulting from operation at 10,000 cycles per second would be of the order of amperes. When each coil element 2 is separately rectified and filtered, there is a maximum alternating-current voltage in the secondary coils 2 of 20 kilovolts. Preferably the primary coil 1 extends from the bottom of the tank 3 to the top thereof in the vicinity of the high voltage terminal 4, since if the location of the primary coil 1 were confined to the lower grounded end only there would be too little coupling between the primary 1 and the secondary coils 2. For 25-kilowatt operation at 1 million volts, the condenser 5 would be 6.7 microfarads; the actual power requirements for such a condenser would be 375 kilovolt-amperes having a cost of about $1500.

In general, high voltage machines could use an even smaller condenser 5 since such high voltage machines would presumably be positive ion machines requiring less power. At 5 million volts and 1 milliampere the condenser 5 would be 1.35 microfarads and therefore very cheap as hereinbefore indicated. In practice an 80-kilovolt-ampere condenser might be used which might cost about $300. Alternative constructions in which large amounts of magnetic flux are created by means of magnetic cores can cost as much as one-half million dollars for an equivalent machine so that a three hundred dollar condenser is in effect replacing a one-half million dollar core.

Although the device shown in Figs. 1 through 4 is an air core transformer, the magnetic flux may be made more uniform by providing magnetic material at the grounded end and at the high voltage end of the magnetic circuit, the reluctance between the two being minimized as much as possible by causing the area to be a large as possible. Thus the tank 3 may be lined with magnetic material as shown at 6 and the high voltage terminal may include magnetic material as shown at 7. Of course, because of the fluctuating magnetic field all the metallic members within the field should include a radial gap in order to minimize current flow therein. Thus, for example, the terminal 4 and the magnetic material 7 should include a radial gap (not shown). The high voltage terminal 4 is supported upon a column 8 which is composed of a multiplicity of units 9 separated by equipotential planes 10. The units 9 and the equipotential planes 10 are annular and are adapted to support an acceleration tube 11 along their mutual axis. The equipotential planes 10 should terminate at their outer extremities in rings 12 of rounded cross section in order to minimize voltage gradients. The cross sections of rings 12 are shown as circular, but may also be of square cross section with rounded corners.

In order to reduce losses due to currents induced by the fluctuating magnetic field, each ring 12 should preferably comprise an insulator 13 upon which a thin metallic layer 14 is deposited.

The arrangement shown is adapted to produce high D.C. but no high A.C., since the output of the transformer is rectified and filtered in small increments.

Each unit 9 comprises essentially four components. The secondary coil elements 2 have already been referred to. One end of each secondary coil 2 is connected to an adjacent equipotential plane 10 and the other end is connected to one end of a rectifier assembly 15. The rectifier assembly comprises a multiplicity of contact-barrier-type rectifiers 16 connected in series. The other end of the rectifier chain 15 is connected to the other adjacent equipotential plane 10. The two equipotential planes 10 are also mutually connected by a condenser 17 and a bleeder resistor 18. The condenser 17 may conveniently comprise two long ribbons of insulating material (such as Mylar) upon each of which is deposited a conductive layer, the ribbons being then laid upon one another and coiled. The bleeder resistor 18 may conveniently comprise a few resistor units 20 connected in series. Each unit 9 is assembled upon a skeleton consisting of a series of concentric insulating rings 21a, 21b, 21c, 21d, 21e and 21f, and a preferred method of assembling the unit 9 is as follows: The innermost ring 21a is rigidly supported in some convenient manner as upon a rigid core (not shown) and the bleeder resistor 18 is wound about the ring 21a. Next the second ring 21b is placed about the bleeder resistor 18, and the condenser 17, which comprises a long ribbon as hereinbefore described, is wound about the second ring 21b. Next the third ring 21c is placed about the condenser 17 and the rectifier assembly 15 is wound about the third ring 21c. If the length of the rectifier assembly 15 is such that more than one turn is required, the turns may be separated by additional insulating rings as shown, for example, at 21d. The rectifier assembly 15 is then surrounded by an additional insulating ring shown at 21e, and the secondary coil element 2 is wound about the ring 21e. A final insulating ring 21f is then placed about the secondary coil element 2, and this assembly is then placed upon an apertured insulating disk 22 which together with the innermost ring 21a and the outermost ring 21f forms an annular cup which is then filled with an epoxy resin 23 which is subsequently permitted to harden, thereby forming a rigid unit 9. The secondary coils 2 should be on the outer circumference, since maximum coupling is provided when the secondary is as close to the primary as possible.

An alternate design is shown in Fig. 4, wherein each unit lies within an equipotential plane 10 instead of lying between adjacent equipotential planes.

Each unit thus comprises a half-wave rectifier of the type shown in the circuit diagram of Fig. 5. In order to minimize ripple, the sense of the coils is reversed from one unit to the next, as shown in the diagram of Fig. 5. Of course, alternative arrangements are possible without departing from the spirit and scope of the invention. Thus, for example, each unit may be connected as a full-wave rectifier.

Although the device is shown with a magnetic lining 6 in the tank 3 and a magnetic core 7 in the high voltage terminal 4, such magnetic material is not necessary and may be removed.

As previously noted, the charging current in the primary circuit is 15 times the load current in accordance with the foregoing description. If it is desired to have high D.C. power this 15 factor is serious. The factor required is related to the area of the column and can be reduced by increasing the diameter of the machine, but such an increase is also undesirable. To cut down the 15 factor without increasing the size of the machine, the embodiment shown in Fig. 6 may be employed. The solid core transformer shown in Fig. 6 cuts this factor down to 0.7. Referring thereto, a high voltage terminal 24 is supported on a column 25 within a grounded tank 26. The column 25 may be constructed from the same units as the column 8 in Fig. 1. The tank 26 is made of or lined with magnetic material and the terminal 24 is also of magnetic material and has a relatively large surface area so as to reduce the reluctance across the gap between the terminal 24 and the tank 26. A magnetic core 27 is connected mechanically and electrically as well as magnetically to the high voltage terminal 24 and extends down through the axis of the column 25. This magnetic core 27 constitutes the central conductor of a coaxial cable adapted to carry the high-voltage D.C. to remote loads, and beyond the end of the generator the core 27 is enclosed within an outer casing 28 which is also of magnetic material, but which is at ground potential. The reluctance between the high voltage conductor 27 and the casing 28 may be reduced by enlarging the diameter of both for a short distance as shown at 29. By enlarging the diameter the air gap for a given voltage can be reduced, thus reducing reluctance not only by increasing the area but also by reducing the size of the gap. If desired, the central conductor 27 may include a copper wire (not shown) along the axis thereof.

In order that the primary coil 30 may be as close as possible to the solid core 27, it is wound close to the column 25 at the grounded end of said column, and its distance from said column 25 is as small as considerations of insulation will permit throughout its length.

Having thus described the principles of the invention together with several illustrative embodiments thereof, it is to be understood that although specific terms are employed they are used in a generic and descriptive sense and not for purposes of limitation, the scope of the invention being set forth in the following claims.

I claim:

1. A nonmagnetic-core transformer for the generation of unidirectional high voltage comprising, in combination: a primary coil assembly adapted to produce magnetic flux in a non-magnetic core, a secondary coil assembly linking said non-magnetic core, means for driving said primary coil assembly, said secondary coil assembly comprising a plurality of units separated by equipotential planes, each unit including a secondary coil element and a rectifier assembly connected in series between adjacent equipotential planes, and a bleeder resistor and a condenser connected between said equipotential planes in parallel with each other and with said series-connected secondary coil element and rectifier assembly.

2. A transformer in accordance with claim 1, wherein said secondary coil element is radially external to said bleeder resistor, condenser, and rectifier assembly.

3. A transformer in accordance with claim 1, wherein the sense of said secondary coil elements alternates from coil element to coil element.

4. A nonmagnetic-core transformer for the generation of unidirectional high voltage comprising, in combination: a primary coil assembly adapted to produce magnetic flux in a non-magnetic core, a secondary coil assembly linking said non-magnetic core, and means for driving said primary coil assembly, said secondary coil assembly comprising a plurality of units separated by equipotential planes, each unit including a secondary coil element and a rectifier assembly supported within an equipotential plane formed by two concentric rings sandwiched between two insulating disks, said coil element and rectifier assembly being connected in series between said equipotential plane and an adjacent equipotential plane.

5. A nonmagnetic-core transformer for the generation of high-current unidirectional high voltage comprising, in combination: a primary coil assembly including a condenser and adapted to produce magnetic flux in a nonmagnetic core, a secondary coil assembly linking said non-magnetic core, and means for driving said primary coil assembly at its resonant frequency, said secondary coil assembly comprising a plurality of units separated by equipotential planes, each unit including a secondary coil element and a rectifier assembly connected in series between adjacent equipotential planes.

6. A solid core transformer for the generation of high power and delivery thereof to remote loads comprising in combination a solid magnetic core terminating at one end in a high voltage terminal of extended surface area, the other end of said core forming the central conductor of a coaxial cable, a primary coil assembly adapted to produce magnetic flux in said core, a secondary coil assembly linking said core, means for driving said primary coil assembly, and a grounded enclosure of magnetic material surrounding said core and having a portion forming the outer conductor of said coaxial cable.

7. Apparatus in accordance with claim 6, wherein the diameters of both said conductors of said coaxial cable are enlarged for a portion of the length of said cable with an accompanying reduction in the spacing between said conductors.

8. Apparatus in accordance with claim 6, wherein said secondary coil assembly comprises a plurality of units separated by equipotential planes, each unit including a secondary coil element and a rectifier assembly connected in series between adjacent equipotential planes.

References Cited in the file of this patent

UNITED STATES PATENTS

| | | |
|---|---|---|
| 2,546,736 | Fry et al. | Mar. 27, 1951 |
| 2,564,881 | Cronshey et al. | Aug. 21, 1951 |